(12) United States Patent
Sandstrom et al.

(10) Patent No.: US 8,848,277 B2
(45) Date of Patent: Sep. 30, 2014

(54) SYSTEM AND METHOD FOR PROTECTING A SEED LASER IN AN EUV LIGHT SOURCE WITH A BRAGG AOM

(71) Applicant: Cymer, Inc., San Diego, CA (US)

(72) Inventors: Richard L. Sandstrom, San Diego, CA (US); Jonathan D. Grava, San Diego, CA (US)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 13/737,858

(22) Filed: Jan. 9, 2013

(65) Prior Publication Data

US 2013/0322482 A1 Dec. 5, 2013

Related U.S. Application Data

(60) Provisional application No. 61/653,978, filed on May 31, 2012.

(51) Int. Cl.
*H01S 3/00* (2006.01)
*H01S 3/23* (2006.01)
*H01S 3/08* (2006.01)
*H05G 2/00* (2006.01)
*H01S 3/223* (2006.01)

(52) U.S. Cl.
CPC . *H01S 3/08* (2013.01); *H01S 3/005* (2013.01); *H01S 3/0085* (2013.01); *H05G 2/008* (2013.01); *H01S 3/2232* (2013.01); *H01S 3/2316* (2013.01); *H01S 3/2383* (2013.01)

USPC .......................... 359/285; 359/305; 359/237

(58) Field of Classification Search
CPC .......... G02F 2201/30; G02F 2201/302; G02F 2201/305; G02F 2201/307; G02F 2201/346; G02F 1/11; G02F 1/113; G02F 1/116; G02F 1/33; G02F 1/332
USPC ................. 359/285–287, 305–315; 385/4–10
See application file for complete search history.

(56) References Cited

U.S. PATENT DOCUMENTS

2007/0189341 A1* 8/2007 Belsley ........................... 372/10
2012/0189027 A1* 7/2012 Belsley ........................... 372/28

\* cited by examiner

*Primary Examiner* — Ricky Mack
*Assistant Examiner* — William Alexander
(74) *Attorney, Agent, or Firm* — Gard & Kaslow LLP

(57) ABSTRACT

A method and apparatus for protecting the seed laser in a laser produced plasma (LPP) extreme ultraviolet (EUV) light system are disclosed in one embodiment, a Bragg AOM is used as a switch on the beam path from the seed laser to other optical components and ultimately to an irradiation site. Power is applied to the Bragg AOM and pulses from the seed laser are thus deflected onto the desired beam path rather than passing straight through the Bragg AOM. Once the pulses have passed through the Bragg AOM, power to the Bragg AOM ceases, so that any reflections from the irradiation site will pass straight through the Bragg AOM and will not be deflected back to the seed laser. Use of the Bragg AOM rather than components previously used results in lower power consumption and better protection for the seed laser.

21 Claims, 5 Drawing Sheets

SYSTEM AND METHOD FOR PROTECTING A SEED LASER IN AN EUV LIGHT SOURCE WITH A BRAGG AOM

FIELD OF THE INVENTION

The present invention relates generally to laser produced plasma extreme ultraviolet light sources. More specifically, the invention relates to a method and apparatus for the use of seed lasers as such light sources.

BACKGROUND OF THE INVENTION

The semiconductor industry continues to develop lithographic technologies which are able to print ever-smaller integrated circuit dimensions. Extreme ultraviolet ("EUV") light (also sometimes referred to as soft x-rays) is generally defined to be electromagnetic radiation having wavelengths of between 10 and 120 nanometers nm). EUV lithography is currently generally considered to include EUV light at wavelengths in the range of 10-14 nm, and is used to produce extremely small features, for example, sub-32 nm features, in substrates such as silicon wafers. To be commercially useful, it is desirable that these systems be highly reliable and provide cost effective throughput and reasonable process latitude.

Methods to produce EUV light include, but are not necessarily limited to, converting a material into a plasma state that has one or more elements, e.g., xenon, lithium, tin, indium, antimony, tellurium, aluminum, etc., with one or more emission line(s) in the EUV range. In one such method, often termed laser produced plasma ("LPP"), the required plasma can be produced by irradiating a target material, such as a droplet, stream or duster of material having the desired line-emitting element, with a laser beam at an irradiation site. The line-emitting element may be in pure form or alloy form, for example, an alloy that is a liquid at desired temperatures, or may be mixed or dispersed with another material such as a liquid.

In some prior art LPP systems, droplets in a droplet stream are irradiated by a separate laser pulse to form a plasma from each droplet. Alternatively, some prior art systems have been disclosed in Which each droplet is sequentially illuminated by more than one light pulse. In some cases, each droplet may be exposed to a so-called "pre-pulse" to heat, expand, gasify, vaporize, and/or ionize the target material and/or generate a weak plasma, followed by a so-called "main pulse" to generate a strong plasma and convert most or all of the pre-pulse affected material into plasma and thereby produce an EUV light emission. It will be appreciated that more than one pre-pulse may be used and more than one main pulse may be used, and that the functions of the pre-pulse and main pulse may overlap to some extent.

Since EUV output power in an LPP system generally scales with the drive laser power that irradiates the target material, in some cases it may also be considered desirable to employ an arrangement including a relatively low-power oscillator, or "seed laser," and one or more amplifiers to amplify the pulses from the seed laser. The use of a large amplifier allows for the use of the seed laser while still providing the relatively high power pukes used in the LPP process.

However, the irradiation of the droplets by the laser pulses may result in reflections and thus light propagating back toward the seed laser. Further, the seed laser may include sensitive optics, and, since the pulses from the seed laser have been amplified, this back-propagating light may be of a large enough intensity to damage the relatively fragile seed laser.

For example, in some cases the amplifier(s) may have a signal gain on the order of 100,000 ($10^5$). In such a case, a typical protection device of the prior art, such as a polarization discriminating optical isolator, which may for example stop approximately 93 to 99 percent of the back-propagating light, may be insufficient to protect the seed laser from damage.

Accordingly, it is desirable to have an improved system and method for protecting the seed laser in such an EUV light source.

SUMMARY OF THE INVENTION

Disclosed herein are a method and apparatus for protecting the seed laser(s) in a laser produced plasma (LPP) extreme ultraviolet (EUV) light system using a Bragg acousto-optic modulator (AOM).

One embodiment describes a system comprising: a laser source producing laser light on a first path; a Bragg acousto-optic modulation device switchable between a first state in which the laser light is deflected from the first path onto a second path toward an irradiation site at which a target material may be irradiated by the laser light and a second state in which the laser light is transmitted in a direction other than onto the second path; a delay device on the second path between the Bragg device and the irradiation site for delaying the laser light; and means for switching the Bragg device from the first state to the second state after the laser light has been deflected onto the second path such that any reflections of the laser light from the irradiation site are transmitted in a direction other than along the first path, and thus prevented from reaching the laser source.

In another embodiment, a system is described comprising: a pre-pulse seed laser that produces laser light; a first Bragg acousto-optic modulation device switchable between a first state in which the laser light from the pre-pulse seed laser is deflected onto a first beam path and a second state in which the laser light is transmitted in a direction other than onto the first beam path; a main pulse seed laser that produces laser light; a second Bragg acousto-optic modulation device switchable between a first state in which the laser light from the main pulse seed laser is deflected onto a second beam path and a second state in which the laser light is transmitted in a direction other than onto the second beam path; a combiner for directing the laser light from the pre-pulse seed laser on the first beam path and the laser light from the main pulse laser on the second beam path onto a common beam path toward an irradiation site at which a target material may be irradiated by the laser light; means for switching the first Bragg device from the first state to the second state after the laser light from the pr& pulse seed laser has been deflected onto the first beam path such that any reflections of the laser light from the irradiation site are prevented from reaching the pre-pulse seed laser; and means for switching the second Bragg device from the first state to the second state after the laser light from the main pulse seed laser has been deflected onto the second beam path such that any reflections of the laser light from the irradiation site are prevented from reaching the main pulse seed laser.

In still another embodiment, a method of protecting a laser pulse source from pulse reflections is described, comprising: generating a laser pulse on a first path from a laser source; passing the laser pulse through a Bragg acousto-optic modulation device, the Bragg device switchable between a first state in which the pulse is deflected onto a second path toward an irradiation site at which a target material may be irradiated by the laser pulse and a second state in which the laser pulse is transmitted in a direction other than onto the second path, while the Bragg device is in the first state; and switching the Bragg device from the first state to the second state after the laser pulse has been deflected onto the second path such that any reflections of the laser pulse from the irradiation site are transmitted in a direction other than along the first path, and thus prevented from reaching the laser source.

DETAILED DESCRIPTION OF THE INVENTION

The present application describes a method and apparatus for protecting the seed laser source(s) in a laser produced plasma (LPP) extreme ultraviolet (EUV) light system.

In one embodiment, a method of protecting a seed laser source involves using a Bragg acousto-optic modulator (AOM) as a switch on the beam path from the seed laser to other optical components and ultimately to the irradiation site. When pulses from the seed laser are generated, power is applied to the Bragg AOM and the pulses are thus deflected onto the desired beam path rather than passing straight through the Bragg AOM, Once the pulses have passed through the Bragg AOM, power to the Bragg AOM ceases, so that any reflections from the irradiation site will pass straight through the Bragg AOM and will not be deflected back to the seed laser. If desired, such reflections may pass through the Bragg AOM into a "beam dump" or cooling component.

Figure 1:
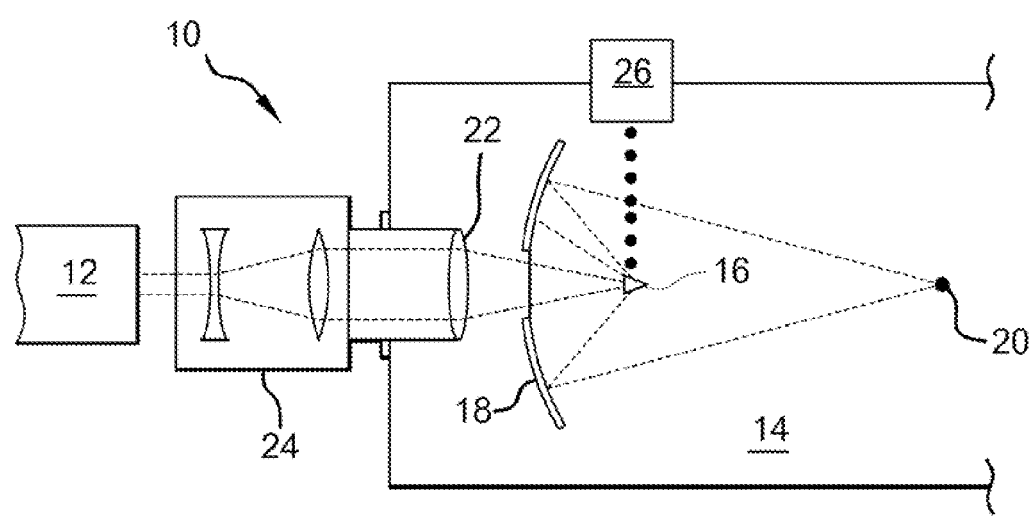
FIG. 1 is an illustration of some of the components of an embodiment of an LPP EUV system.

FIG. 1 is a simplified schematic view of some of the components of one embodiment of an LPP RN light source 20. As shown in FIG. 1, the EUV light source 10 includes a laser source 12 for generating a beam of laser pulses and delivering the beam along one or more beam paths from the laser source 12 and into a chamber 14 to illuminate a respective target, such as a droplet, at an irradiation region 16. Examples of laser arrangements that may be suitable for use in the system 12 shown in FIG. 1 are described in more detail below.

As also shown in FIG. 1, the EUV light source 10 may also include a target material delivery system 26 that, for example, delivers droplets of a target material into the interior of chamber 14 to the irradiation region 16, where the droplets will interact with one or more laser pulses to ultimately produce plasma and generate an EUV emission. Various target material delivery systems have been presented in the prior art, and their relative advantages will be apparent to those of skill in the art.

As above, the target material is an EUV emitting element that may include, but is not necessarily limited to, a material that includes tin, lithium, xenon or combinations thereof. The target material may be in the form of liquid droplets, or alternatively may be solid particles contained within liquid droplets. For example, the element tin may be presented as a target material as pure tin, as a tin compound, such as $SnBr_4$, $SnBr_2$, $SnH_4$, as a tin alloy, e.g., tin-gallium alloys, tin-indium alloys, or tin-indium-gallium alloys, or a combination thereof. Depending on the material used, the target material may be presented to the irradiation region 16 at various temperatures including room temperature or near room temperature e.g., tin alloys or $SnBr_4$), at a temperature above room temperature (e.g., pure tin), or at temperatures below room temperature (e.g., $SnH_4$). In some cases, these compounds may be relatively volatile, such as $SnBr_4$. Similar alloys and compounds of EUV emitting elements other than tin, and the relative advantages of such materials and those described above will be apparent to those of skill in the art.

Returning to FIG. 1, the EUV light source 10 may also include an optical element 18 such as a near-normal incidence collector mirror having a reflective surface in the form of a prolate spheroid (i.e., an ellipse rotated about its major axis), such that the optical element 18 has a first focus within or near the irradiation region 16 and a second focus at a so-called intermediate region 20, where the EUV light may be output from the EUV light source 10 and input to a device utilizing EUV light such as an integrated circuit lithography tool (not shown). As shown in FIG. 1, the optical element 18 is formed with an aperture to allow the laser light pulses generated by the laser source 12 to pass through and, reach the irradiation region 16.

The optical element 18 should have an appropriate surface for collecting the EUV light and directing it to the intermediate region 20 for subsequent delivery to the device utilizing the EUV light. For example, optical element 18 might have a graded multi-layer coating with alternating layers of molybdenum and silicon, and in some cases, one or more high temperature diffusion barrier layers, smoothing layers, capping layers and/or etch stop layers.

It will he appreciated by those of skill in the art that optical elements other than a prolate spheroid mirror may be used as optical element IS. For example, optical element 18 may alternatively be a parabola rotated about its major axis or may he configured to deliver a beam having a ring-shaped cross section to an intermediate location. In other embodiments, optical element 18 may utilize coatings and lavers other than or in addition to those described herein. Those of skill in the art will be able to select an appropriate shape and composition for optical element 18 in a particular situation.

As shown in FIG. 1, the EUV light source 10 may include a focusing unit 22 which includes one or more optical elements for focusing the laser beam to a focal spot at the irradiation site. EUV light source 10 may also include a beam conditioning unit 24, having one or more optical elements, between the laser source 12 and the focusing unit 22, for expanding, steering and/or shaping the laser beam, and/or shaping the laser pulses. Various focusing units and beam conditioning units are known in the art, and may be appropriately selected by those of skill in the art.

Figure 2:
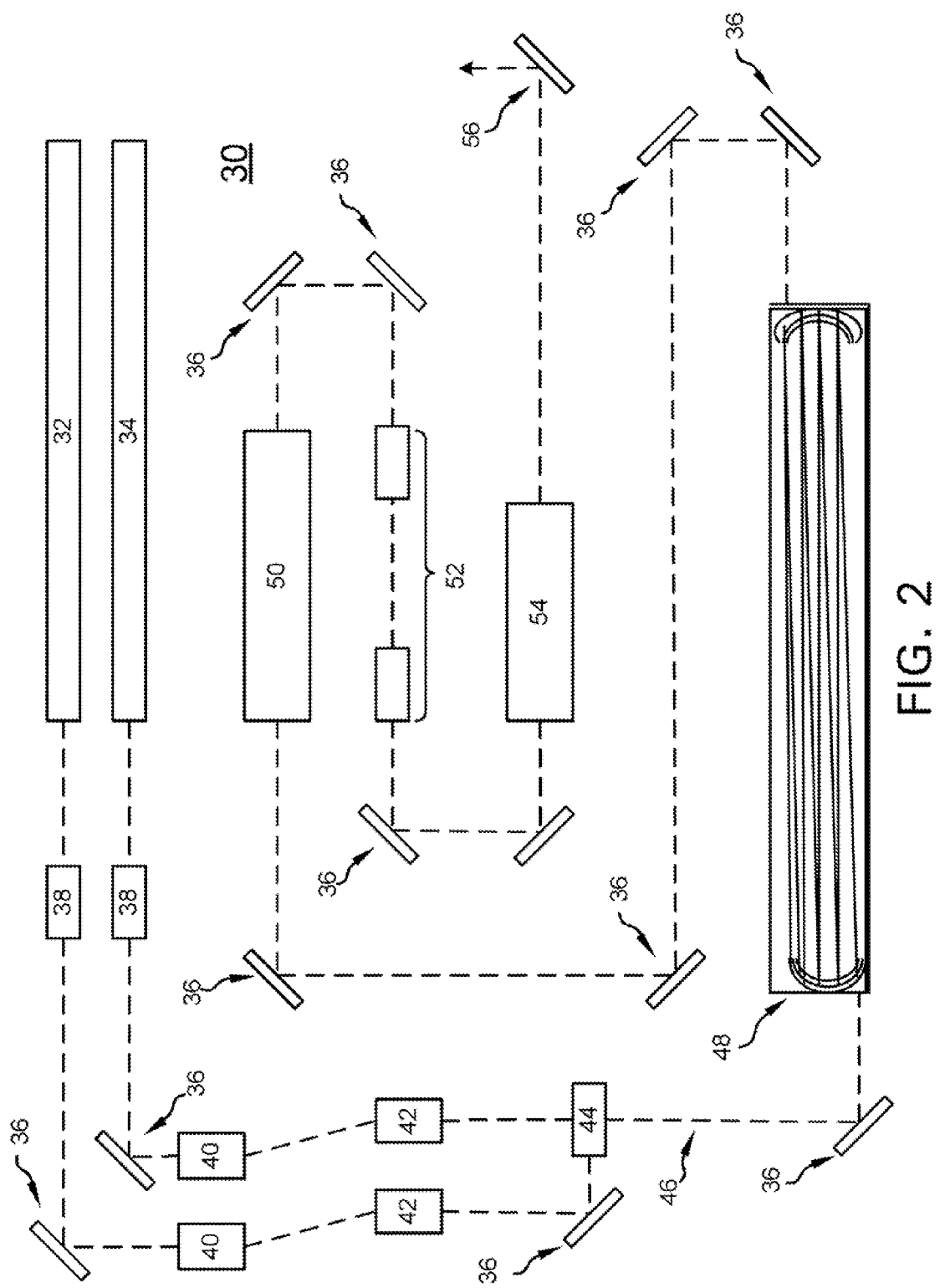
FIG. 2 is an illustration of some of the components of a seed laser module that may he used in an LPP EUV system.

As noted above, in some cases an LPP EUV system uses one or more seed lasers to generate laser pulses, which may then he amplified to become the laser beam that irradiates the target material at irradiation site 16 to form a plasma that produces the EUV emission. FIG. 2 is a simplified schematic view of one embodiment of a seed laser module 30 that may he used as part of the laser light source in an LPP EUV system.

As illustrated in FIG. 2, seed laser module 30 includes two seed lasers, a pre-pulse seed laser 32 and a main pulse seed laser 34. One of skill in the art will appreciate that where such an embodiment containing two seed lasers is used, the target material may he irradiated first by one or more pulses from the pre-pulse seed laser 32 and then by one or more pulses from the main pulse seed laser 34.

Seed laser module 30 is shown as having a "folded" arrangement rather than arranging the components in a straight line. In practice, such an arrangement is typical in order to limit the size of the module. To achieve this, the beams produced by the laser pulses of pre-pulse seed laser 32 and main pulse seed laser 34 are directed onto desired beam paths by a plurality of optical components 36. Depending upon the particular configuration desired, optical components 36 may he such elements as lenses, filters, prisms, mirrors or any other element which may be used to direct the beam in a desired direction. In some cases, optical components 36 may perform other functions as well, such as altering the polarization of the passing beam.

As is known to those of skill in the art, the seed lasers contain relatively fragile optical components, such as the output coupler, polarizer, rear mirror, grating, acousto-optical modulation (AOM) switches, etc. Thus, it is desirable to prevent any light that may be reflected from the target material at the irradiation site from reaching and damaging these components.

In the embodiment of FIG. 2, the beams from each seed laser are first passed through an electro-optic modulator 38 (EOM). The EOMs 38 are used with the seed lasers as pulse shaping units to trim the pulses generated by the seed lasers to pulses having shorter duration and faster tall-time. A shorter pulse duration and relatively fast fall-time may increase EUV output and light source efficiency because of a short interaction time between the pulse and a target, and because unneeded portions of the pulse do not deplete amplifier gain. While two separate pulse shaping units (EOMs 38) are shown, alternatively a common pulse shaping unit may be used to trim both pre-pulse and main pulse seeds.

The beams from the seed lasers are then passed through acousto-optic modulators (AOMs) 40 and 42. As will be explained below, the AOMs 40 and 42 act as "switches" or "shutters," which operate to divert any reflections of the laser pulses from the target material from reaching the seed lasers; as above, seed lasers typically contain sensitive optics, and the AOMs 40 and 42 thus prevent any reflections from causing damage to the seed laser elements. In the embodiment shown here, the beams from each seed laser pass through two AOMs; however, in some embodiments, the beams from each seed laser may be passed through only a single AOM on each path.

After passing through the AOMs 40 and 42, the two beams are "combined" by beam combiner 44. Since the pulses from each seed laser are generated at different times, this really means that the two temporally separated beams are placed on a common beam path 46 for further processing and use.

After being placed on the common beam path, the beam from one of the seed lasers (again, there will only be one at a time) passes through a beam delay unit 48 such as is known in the art and as will be explained further below. Next, the beam is directed through a pre-amplifier 50 and then through a beam expander 52. Following this, the beam passes through a thin film polarizer 54, and is then directed onward by optical component 56, which again is an element which directs the beam to the next stage in the LPP EUV system and may perform other functions as well. From optical component 56, the beam typically passes to one or more optical amplifiers and other components, as will be illustrated below.

Various wavelength tunable seed lasers that are suitable for use as both pre-pulse and main pulse seed lasers are known in the art. For example, in one embodiment a seed laser may be a CO2 laser having a sealed filling gas including $CO_2$ at sub-atmospheric pressure, for example, 0.05 to 0.2 atmospheres, and pumped by a radio-frequency discharge. In some embodiments, a grating may be used to help define the optical cavity of the seed laser, and the grating may be rotated to tune the seed laser to a selected rotational line.

FIGS. 3 through 7 are simplified schematics of various embodiments of a portion of a laser source 100 for use in the light source 12 shown in FIG. 1, each of a different configuration. Some of the elements shown in these figures correspond to elements that appear in FIGS. 1 and 2 above.

Figure 3:
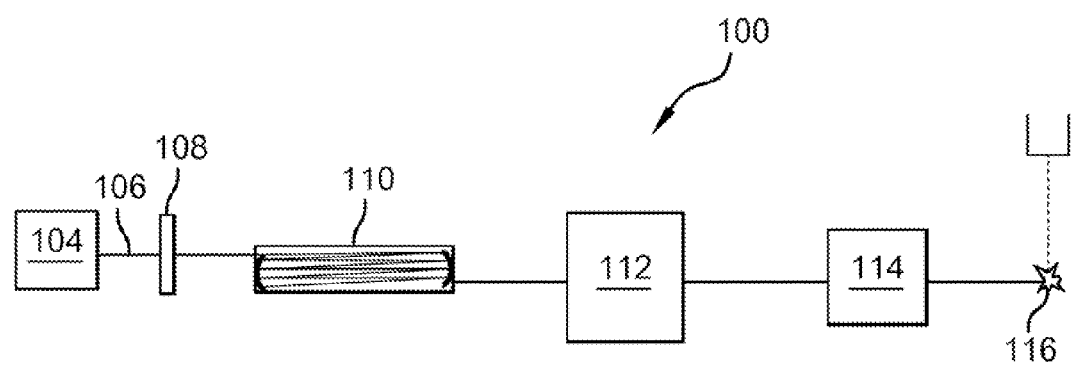
FIG. 3 is another illustration of some of the components of an embodiment of an LPP EUV system.

FIG. 3 shows a first example of a laser source 100 having components that provide protection for a seed laser from reflected light. As shown, the device 100 includes a single seed laser 104 which produces a light output on beam path 106 which passes through a switch 108, a beam delay unit 110, an amplifier 112, and a beam conditioning unit 114, and subsequently interacts with a target material at an irradiation site 116.

The amplifier 112 may have one or more amplifying units, each having a sealed gas and excitation source, and the beam conditioning unit 114 may have one or more optical components for expanding, steering, pulse shaping, focusing and/or shaping the beam.

Switch 108 is reconfigurable between a first, open state which allows light to flow substantially unimpeded through the switch along beam path 106 and a second, closed state which deflects and/or diffuses a substantial portion of light from the beam path 106. In some cases, two such switches may be serially positioned adjacent to one another along the beam path to increase the amount of the light which is deflected from the beam path when the switches are closed. Thus, if the first switch deflects 90% of the incident light and passes the remaining 10% to the second switch, and the second switch similarly deflects 90% of the light incident upon it, the combined effect of the two switches will be to deflect 99% of the light incident upon the first switch.

Beam delay unit 110 such as is known in the art is located on beam path 106 between the switch 108 and amplifier 112. Beam delay unit 110 has a beam folding optical arrangement including optical components such as mirrors, prisms, etc., such that light passing through the unit travels an optical delay distance, $d_{delay}$. Using an estimated light speed of about $3 \times 10^8$ meters per second, each meter of beam delay adds an additional approximately 3.33 ns of travel time for the light on the beam path 106.

In one embodiment, the beam delay unit 110 is sized with a length such that the round trip time from the switch 108 to the irradiation site 116 and back, including a suitable margin of safety, exceeds the dose time of the switch 108, so that switch 108 has time to close to prevent light reflected, from the target material at the irradiation site from reaching seed laser 104. Such a round trip time would thus include twice the travel time from the switch 108 to the beam delay unit 110, twice the one-way travel time in the beam delay unit 110, twice the travel time from the beam delay unit 110 to the amplifier 112, twice the one way travel time in the amplifier 112, twice the travel time from the amplifier 112 to the beam conditioning unit 114, twice the one way travel time in the beam conditioning unit 114 and twice the travel time from the beam conditioning unit 114 to the irradiation site 116.

There are various types of switches that may switch between a first, open state which allows light to flow through the switch along beam path 106 and a second, closed state which deflects and/or diffuses most of the light. One such type of switch is an acousto-optic modulator (AOM). An AOM uses the acousto-optic effect, in which an acoustic (sound)

wave within a material causes a change in the optical characteristics of the material, to diffract and shift the frequency of light passing through the AOM.

An AOM is typically activated by a piezoelectric transducer (PZT) attached to the AOM. Power (typically RF power) is applied to the PZT as an oscillating electric signal, which causes the PZT to vibrate and creates the acoustic wave in the AOM. When no power is applied, there is thus no acoustic wave, and light is transmitted directly through the AOM; when power is applied, the acoustic wave is present and the incident light beam is deflected in "deflection mode" and shifted in frequency. Due to the desired switching speeds, power is typically applied to the PZT at the direction of a processor or controller.

It is because of the frequency shift that AOMs are often used in pairs, as shown in FIG. 2. This allows the shift in frequency by a first AOM to be countered by the use of a second AOM in which the acoustic wave is applied from the opposite side of the AOM so that it produces a similar shift in frequency but in the opposite direction, thus resulting in a signal of the original frequency. This can be important in maintaining the appropriate center frequency of a signal for proper amplification by an amplifier. However, in some circumstances only a single AOM may be used. One of skill in the art will appreciate that the frequency shift is a function of the diffraction order; a +1 diffracted order adds to the frequency, while a −1 diffracted order subtracts from the frequency. The sign of the order is determined by the direction of the acoustic wave in the crystal and the angle of incidence of the beam in the crystal. One of skill in the art will also appreciate when a pair of AOMs should be used and when a single AOM may be appropriate.

There are different types of AOMs; two such types are a Raman-Nath AOM and, a Bragg AOM. A Raman-Nath AOM was initially selected for use as switch 108 in some prior art embodiments (as AOMs 40 in FIG. 2 might be as well) due to expected advantages over the Bragg AOM, which was believed to be unsuitable for this purpose.

It has previously been thought that in using an AOM as switch 108, the AOM should be "off," or "open," to allow the seed pulse to pass, and then turned "on" or "closed" to divert any reflected light. This avoids any deflection of the seed pulse which may cause distortion. With respect to the reflected light, in general, a Raman-Nath AOM operates more efficiently than a Bragg AOM in deflecting light when the AOM is "on" i.e., in "deflection mode." Raman-Nath AOMs were also thought to better maintain the integrity of the incident light beam. Finally, a Raman-Nath AOM switches from "open" to "closed" position faster than a Bragg AOM. For this reason, it has previously been thought best to use a Raman-Nath AOM as switch 108, by letting the seed pulse pass while the AOM is "off" and applying power to the AOM once the seed pulse has passed so that any reflected light returning is deflected.

A description of a device using a Raman-Nath AOM as switch 108 may be found in U.S. patent application 13/071,757, publication number 2012/0092746, filed on Mar. 13, 2011 and commonly owned by the assignee of the present application. As described therein, in a typical Raman-Nath AOM, a fully-open to fully-dosed switch time for a beam 3 millimeters (mm) in diameter might be in the range of about 300-500 ns. Thus, in some cases a close time of about 400 ns might be assumed for design purposes, so that a round trip time from the switch 108 to the irradiation site 116 and back of about 800-1000 ns may be considered sufficient to allow the switch 108 to close.

Suppose that in the operation of the device 100 shown in FIG. 3, a pulse of light is first emitted from seed laser 104 at time t=0, having, for example, a pulse duration of about 100 ns. The trailing edge of the pulse exits switch 108 at about t=100 ns at which time switch 108 is activated to close. Assuming a 100 m beam delay path in delay unit 110, this results in a pulse delay of approximately 333 us. Adding a light travel time of about 150 ns from the beam delay unit 110 to the irradiation site 116, the leading edge of the pulse will reach the irradiation site 116 at about t=453 ns, and the trailing edge I the pulse will reach the irradiation site 116 at about 583 ns, If switch 108 has a close time of about 400 ns or so, it should be fully dosed by t=500 ns. Any reflections from the droplet will reach the closed switch 108 at a time 483 ns after the time of the reflection, i.e., 150 ns to travel from the irradiation site back to the pulse delay unit 110 and 333 ns of delay by the pulse delay unit 110. Thus, any reflection from the leading edge of the pulse will reach switch 108 at approximately t=966 ns, while a reflection from the trailing edge of the pulse should reach switch 108 at approximately t=1066 ns. Assuming that switch 108 is closed by t=500 ns, this provides a factor of safety of at least approximately 466 ns.

However, since the selection of a Raman-Nath AOM as switch 108, it has been found in practice that the Raman-Nath AOM suffers from a number of problems in actual use. As above, the Raman-Nath AOM is "closed" and diverts the incident light beam when it is "on," i.e., receiving power. Since switch 108 is intended to be dosed most of the time, this means that the Raman-Nath AOM must receive power most of the time; in operation, the Raman-Nath AOM is typically receiving power about 90% of the time or more. At such a 90% or higher duty cycle, a Raman-Nath AOM will generally not have a long life, and thus must be replaced relatively often.

Such a high duty cycle also results in about 100 watts of average power being delivered into the Raman-Nath AOM material (a crystal) by the acoustic wave, heating it and producing severe cylindrical lensing of the beam which effectively drops transmission through the switch and introduces aberrations in the beam (for example, astigmatism and/or unwanted focus). It is also known that the increase in temperature of the Raman-Nath AOM increases the optical absorption of the switch, and this may potentially cause a state of optical thermal runaway at a lower optical power than expected.

Another issue is the frequency with which the switch 108 must be turned on and off. The seed lasers may operate at frequencies ranging from approximately 50 KHz to 100 KHz or more, Which means switch 108 must also cycle at that rate. At a pulse rate of 50 KHz a Raman-Nath AOM works, but at higher frequencies such as 100 KHz it becomes less reliable. Also, at such a high frequency there is beam distortion.

In addition, the diversion efficiency of a Raman-Nath AOM degrades easily with the duty cycle and hard use. In some cases, after substantial use Raman-Nath AOMs have been observed to pass 10% of the incident beam even when in the "closed" state, rather than the 3% passed when they were new. With two such AOMs in series, this would result in the contrast ratio, as above the ratio of the incident light to the transmitted light, dropping from 1000 to 1 down to 100 to 1, i.e., instead of allowing only 0.1% of the incident light to pass, ten times more, or 1%, of the light would pass even the two "closed" switches.

Finally, because a Raman-Nath operates as a "dosed" switch and diverts the reflected light when the acoustic wave is applied, if power to the Raman-Nath switches is lost, the switches revert to the "open" function and allow the reflected light to pass through. Thus, in such a situation any reflections will pass through the switch and may damage the seed laser (s).

For these reasons, Bragg AOMs have now been considered as alternatives to the Raman-Nath AOMs in spite of the advantages of Raman-Nath AOMs discussed above. In particular, by using Bragg AOMs to pass the seed laser pulses while "ion," i.e., in "deflection mode," a number of advantages are obtained over the prior use of Raman-Nath AOMs. While there is some distortion of the seed laser pulse by the Bragg AOM when "on," it has been found that the loss in beam energy in this case is acceptable, as the seed laser pulses may be sufficiently amplified even after passing through an operating Bragg AOM.

By using the Bragg AOMs to pass the seed laser pulses in the "on" position or "deflection mode," rather than in the "off" mode as with the Raman-Nath AOMs, the Bragg AOMs are on only about 2 to 3% of the time, rather than the 90%+ of the time that the Raman-Nath AOMs must be powered in operation. Because much less power is applied to the Bragg AOMs, there is less thermal lensing and distortion of the beam, and a longer life cycle of the Bragg MAU, as well as a greater number of available commercial products due to the lower operating parameters.

Finally, if power to the Bragg AOMs is lost, the Bragg AOMs return to their "off" position, transmitting the reflected beam directly rather than deflecting it back along the beam path, and thus preventing the reflections from reaching the seed laser. The fact that the Bragg AOM is are not as fast as the Raman-Nath AOMs may be compensated for b increasing the optical delay in a beam delay unit (such as beam delay unit 48 in FIG. 1 or beam delay unit 110 in FIG. 3) to a longer period if necessary.

When the Bragg AOMs are operated in diversion mode, the beam(s) passing through them are diverted. This is illustrated in FIG. 2, where the first Bragg AOM 40 through which a beam passes alters the direction of the beam, and the second Bragg AOM 42 returns the beam to a path that is parallel to, but offset from, the path of the beam before the first Bragg AOM. It may thus be seen that if a reflection reaches a Bragg AOM 42, and the Bragg AOM 42 has been switched off and is no longer in diversion mode, the beam will not proceed along the beam path back to the respective seed laser, but will exit Bragg AOM 42 in the direction in which it enters. For additional safety, a "beam dump" element (not shown), which may include a cooling element, may be added to contain such a reflected beam.

When a Bragg AOM is excited by a 40 MHz acoustic wave, the diversion of the beam is in a direction 77 milliradians (mrad) away from the direction of the incident beam. Where two Bragg AOMs such as Bragg AOMs 40 and 42 are located 525 millimeters (mm) apart, this results in the path of the beam out of the second Bragg AOM 42 being laterally offset 30 mm from the path of the beam into the first Bragg AOM 40.

Other embodiments of a device having components that provide protection of the seed laser(s) from reflected light are shown in FIGS. 4 through 7. In these embodiments, Bragg AOMs may again be used as switches that may be dosed to protect the seed lasers as described above.

In FIG. 4, a laser source 200 again has switch 108 and beam delay unit 110 to provide protection for the seed laser 104 from reflections; laser source 200 as shown also has an optional optical isolator 202 that may be included for additional protection against reflections if desired. As in laser source 100 in FIG. 3, device 200 again includes a seed laser 104 producing a light output on beam path 106 which passes through switch 108, beam delay unit 110, amplifier 112, and beam conditioning unit 114, and subsequently interacts with a target material at an irradiation site 116.

Figure 4:
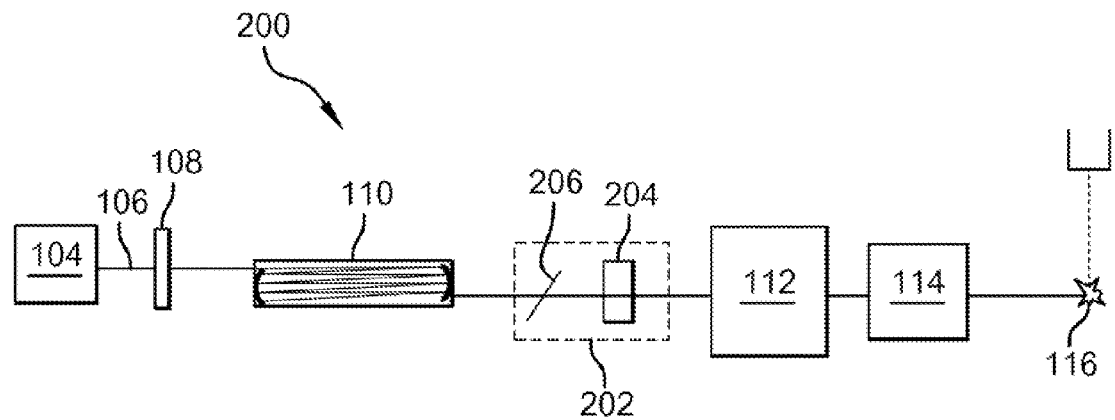
FIG. 4 is another illustration of some of the components of an embodiment of an LPP EUV system.

In the embodiment of FIG. 4, seed laser 104 may include one or more polarizer(s) and/or Brewster's windows not shown) such that light exiting seed laser 104 has a primary polarization direction. As shown, an optical isolator 202 includes a phase retarding optical component 204, such as a quarter wave assembly, and a polarizer 206 that is aligned parallel to the primary polarization direction of the seed laser. In this configuration, light exiting the oscillator on beam path 106 with the primary polarization direction will pass through switch 108 and beam delay unit 110, and then through the polarizer 206 and be altered by the phase retarding optical component 204 so that it exits optical isolator 202 with circular polarization.

This light on beam path 106 will continue through the amplifier 112 and beam conditioner unit 114, and then reflect from the target material where an additional phase retardation due to plasma reflection will occur, resulting in an elliptically polarized state. The reflected light will pass back through the beam conditioning unit 114 and amplifier 112, and then be incident upon the phase retarding optical component 204. Upon passing through the phase retarding optical component 204, the reflected light will be altered again, exiting the phase-retarding optical component 204 in a polarization state such that when it reaches polarizer 206, most of the light, perhaps 93% or so, will be absorbed or reflected, and the remaining approximately 6 to 7% of the light can leak through polarizer 206.

The light which leaks through the polarizer 206, which may be substantial due to the large gain of the amplifier 112, e.g., 300 to 350 watts or more, will pass through the beam delay unit 110 and reach the closed switch 108. However, due to the reduction in reflected light h optical isolator 202 of over 90%, switch 108 need not block as much light to protect oscillator 104 as in the embodiment of FIG. 3.

Figure 5:
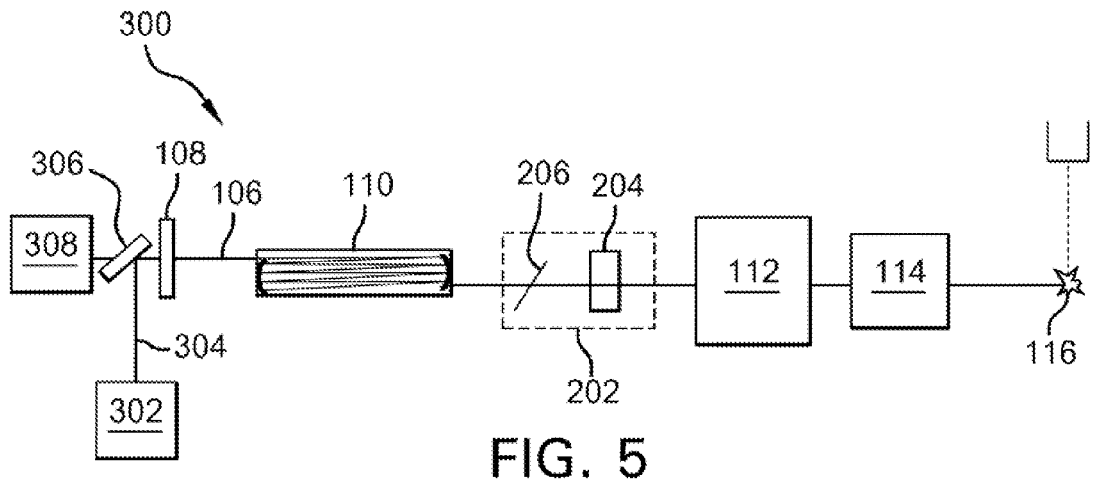
FIG. 5 is another illustration of some of the components of an embodiment of an LPP EUV system.

FIG. 5 shows another embodiment of a laser source 300 having seed lasers and components that provide protection from reflected, light. As shown in FIG. 5, device 300 includes a rue-pulse seed laser 302 which produces a light output on beam path 304 that is reflected by beam combiner 306 onto common beam path 106, and a main pulse seed laser 308 which produces a light output which passes through beam combiner 306 onto common beam path 106.

For example, beam combiner 306 may be a diffraction grating, dichroic beam combiner, prism, volume Bragg grating, polarization discriminating beam combiner or partially reflecting beam combiner or other suitable optical component for placing the beams on common beam path 106. Also as above, although the beam combiner 306 is shown reflecting the pre-pulse seed and transmitting the main, pulse seed, it is to be appreciated that the beam combiner 306 could be arranged to reflect the output of the main pulse seed laser and transmit the output of the pre-pulse seed laser.

Once on common beam path 106, the seed outputs pass through switch 108, beam delay unit 110, optical isolator 202, amplifier 112, beam conditioning unit 114, and subsequently interact with a target material at an irradiation site 116, all as previously described above with reference to FIG. 4.

In one application of device 300, switch 108 is initially opened allowing a laser pulse from pre-pulse seed laser 302 to pass through switch 108 and is thereafter closed to block "pre-pulse" reflections from the droplet. After a predetermined period that is related to the pre-pulse duration and the length of the path from switch 108 to the droplet, switch 108 can be opened to allow a laser pulse from the main pulse seed laser 308 to pass through and switch 108 is thereafter dosed to block "main pulse" reflections from the droplet. The process can then be repeated to irradiate another target material droplet.

Figure 6:
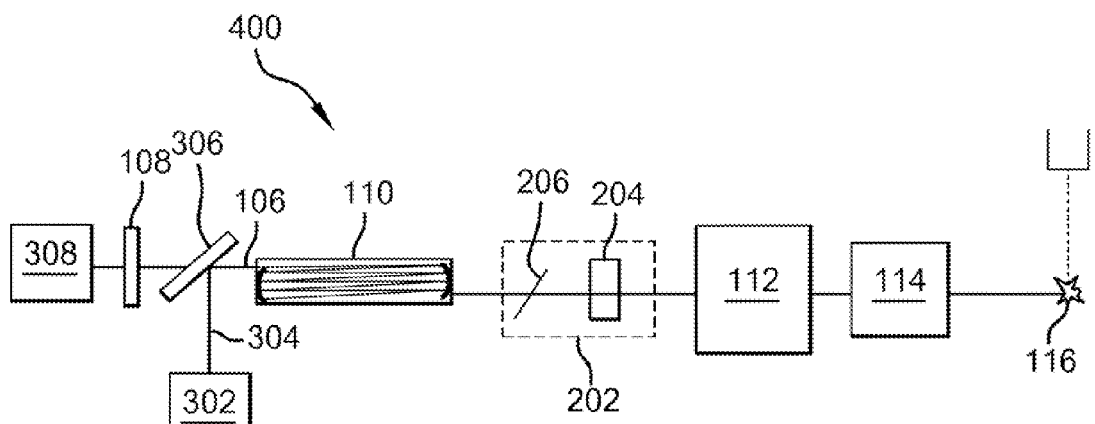
FIG. 6 is another illustration of sonic of the components of an embodiment of an LPP EUV system.

FIG. 6 shows another embodiment of a laser source 400 having seed lasers and component providing protection for the seed lasers from reflections. In this configuration, as in device 300 in FIG. 5, the device 400 includes a pre-pulse seed laser 302 which produces a light output on beam path 304 that is reflected, by beam combiner 306 onto common beam path 106, and a main pulse seed laser 308 which produces a light output which passes through beam combiner 306 onto common beam path 106. Similarly, once on common beam path 106, the main pulse seed output passes through beam delay unit 110, optical isolator 202, amplifier 112, beam conditioning unit 114 and subsequently interacts with a target material at an irradiation site 116.

In FIG. 6, however, switch 108 is located between main pulse seed laser 308 and beam combiner 306, rather than between beam combiner 308 and beam delay unit 110 as in device 300 in FIG. 5. Thus, the operation of device 400 in FIG. 6 is slightly different than that of device 300 in FIG. 5. In one method of operation of device 400, a laser pulse from the pre-pulse seed laser is generated and directed to the droplet. Switch 108 is initially closed to protect the main pulse seed laser from "pre-pulse" reflections, i.e., reflections of the pre-pulse from the droplet.

After a predetermined period that is related to the pre-pulse duration and the length of the path from the switch 108 to the droplet as described above, the switch 108 can be opened to allow a laser pulse from the main pulse seed laser to pass through the switch. Switch 108 is thereafter again closed to block "main pulse" reflections from the droplet. The process can then be repeated to irradiate another target material droplet. By coordinating the effects of beam combiner 306 and, optical isolator 202, reflections from the droplets are prevented from being further reflected onto beam path 304 and back to pre-pulse seed laser 302.

Figure 7:
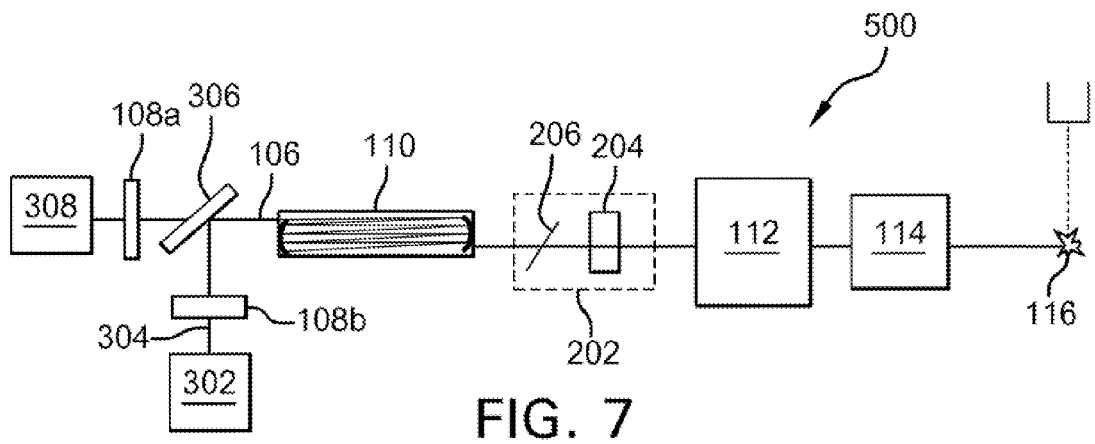
FIG. 7 is another illustration of some of the components of an embodiment of an LPP EUV system.

FIG. 7 shows another embodiment of a laser source 500 having a pre-pulse seed laser, main pulse seed laser and a seed protection unit. In this embodiment, the device 500 again includes a pre-pulse seed laser 302 which produces a light output on beam path 304 that is reflected by beam combiner 306 onto common beam path 106, and a main pulse seed laser 308 which produces a light output which passes through beam combiner 306 onto common beam path 106. Similarly, once on common beam path 106, the main pulse seed output passes through beam delay unit 110, optical isolator 202, amplifier 112, beam conditioning unit 114 and subsequently interacts with a target material at an irradiation site 116.

In this embodiment, there are two switches 108a and 108b located between the respective seed lasers and beam combiner 306. The output of the pre-pulse seed laser 302 passes through switch 108b before being directed onto common beam path 106 by beam combiner 306, while the output of main pulse seed laser 308 passes through switch 108a before passing through beam combiner 306 onto common beam path 106.

In one method of operation of device 500, switch 108a is initially closed. A laser pulse from pre-pulse seed laser 302 is generated and passes through open switch 108b and is reflected by beam combiner 306 onto common beam path 106 and directed to the droplet. The switch 108b is then closed to protect the pre-pulse seed laser from both "pre-pulse" and "main pulse" reflections from the droplet. After as predetermined period that is related to the pre-pulse duration and the length of the path from the switch 108a to the droplet, the switch 108a can be opened to allow a laser pulse from the main puke seed laser to pass through the switch, and is thereafter dosed to block "main pulse" reflections from the droplet. The process can then be repeated to irradiate another target material droplet. In some implementations, the switch 108a may be opened to pass a laser pulse from the main pulse while "pre-pulse" reflections are still reaching the beam combiner 306. For example, a desired delay between the pre pulse and main pulse may be such that the switch 108a is open during pre-pulse reflections.

In some cases, the beam combiner 306 may be a partial reflector that reflects greater than 50 percent and transmits less that 50 percent of incident light. For example, if beam combiner 306 is a 90 percent reflector, then 90 percent of any light that leaks through the optical isolator 202 would reach closed switch 108b and only about 10 percent would reach the main pulse seed laser. As above, in one embodiment, a delay of about 1000 ns between the pre-pulse and main pulse may be suitable, with a pre-pulse duration of about 100 ns and a main pulse duration of about 100 ns.

Figure 8:
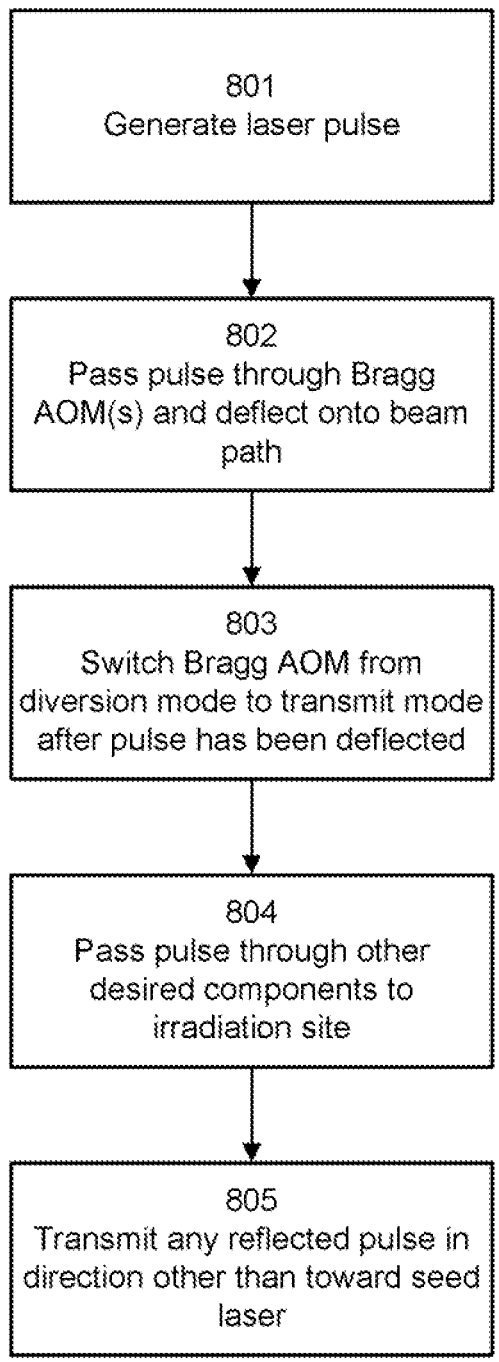
FIG. 8 is a flowchart of one embodiment of a method of protecting a seed laser as described herein.

FIG. 8 is a flowchart of one embodiment of a method of protecting a seed laser as described herein. At step 801, a laser pulse is generated, for example, by a seed laser, (As above, the "beam" is a sequence of pulses, each pulse subjected to the same steps.) At step 802, the pulse is then passed through one or more Bragg AOMs operating in "on" or diversion mode, which deflect the pulse onto the beam path toward the irradiation site. As above, the desired beam path will take the deflection(s) by the Bragg AOMs into account.

Once the pulse has been deflected onto the beam path by a Bragg AOM, the Bragg AOM is switched from diversion mode to transmit mode at step 803, i.e., power to the Bragg AOM is removed. At step 804, the pulse may then be passed through any other desired optical components, such as the beam delay unit, optical isolator, amplifier(s), beam conditioning units, etc., as described above. Note that steps 803 and 804 will likely occur simultaneously, at least in part, as the pulse will proceed along the beam path while the Bragg AOM switches modes.

As above, as long as the time it takes for the pulse to reach the irradiation site and return is long enough, the Bragg AOM is able to switch from diversion mode to transmit mode before any light reflected from the irradiation site returns to the Bragg AOM so that at step 805 the reflected light will be transmitted straight through the Bragg AOM and not deflected. Since the light from the seed laser was previously deflected onto the beam path when the Bragg ACM was in diversion mode, the reflected light is thus not transmitted back along the same path to the seed laser, so that such reflections are prevented from reaching the seed laser and possibly causing damage thereto. Again, the reflected light may go into a beam dump if desired.

The disclosed method and apparatus has been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than those described above. For example, different algorithms and/or logic circuits, perhaps more complex than those described herein, may be used, and possibly different types of drive lasers and/or focus lenses.

Note that as used herein, the term "optical component" and its derivatives includes, but is not necessarily limited to, one or more components which reflect and/or transmit and/or operate on incident light and includes, but is not limited to, one or more lenses, windows, filters, wedges, prisms, grisms, gradings, transmission fibers, etalons, diffusers, homogenizers, detectors and other instrument components, apertures, axicons and mirrors including multi-layer mirrors, near-normal incidence mirrors, grazing incidence mirrors, specular reflectors, diffuse reflectors and combinations thereof. Moreover, unless otherwise specified, neither the terms "optic," "optical component" nor their derivatives, as used herein, are meant to be limited to components which operate solely or to advantage within one or more specific wavelength range(s) such as at the EUV output light wavelength, the irradiation laser wavelength, a wavelength suitable for metrology or some other wavelength.

As noted herein, various variations are possible. A single seed laser may be used in some cases rather than the two seed lasers illustrated in the Figures. A common switch may protect two seed lasers, or either or both of the seed lasers may have their own switches for protection. A single Bragg AOM may be used in some instances, or more than two Bragg AOMs may be used to protect a single seed laser if desired.

It should also be appreciated that the described method and apparatus can be implemented in numerous ways, including as a process, an apparatus, or a system. The methods described herein may be implemented by program instructions for instructing a processor to perform such methods, and such instructions recorded on a computer readable storage medium such as a hard disk drive, floppy disk, optical disc such as a compact disc (CD) or digital versatile disc (DVD), flash memory, etc., or a computer network wherein the program instructions are sent over optical or electronic communication links. Such program instructions may be executed by means of a processor or controller, or may be incorporated into fixed logic elements. It should be noted that the order of the steps of the methods described herein may be altered and still be within the scope of the disclosure.

These and other variations upon the embodiments are intended to be covered, by the present disclosure, which is limited only by the appended claims.

What is claimed is:

1. A system comprising:
a laser source producing laser light on a first path;
a Bragg acousto-optic modulation device switchable between a first state in which the laser light is deflected from the first path onto a second path toward an irradiation site at which a target material may he irradiated by the laser light and a second state in which the laser light is transmitted in a direction other than onto the second path;
a delay device on the second path between the Bragg device and the irradiation site for delaying the laser light; and
means for switching the Brag device from the first state to the second state after the laser light has been deflected onto the second path such that at least a portion of any reflections of the laser light from the irradiation site are transmitted in a direction other than along the first path, and thus prevented from reaching the laser source.

2. The system of claim 1 wherein, the laser source is a seed laser.

3. The system of claim 1 wherein the delay device comprises a folding optical arrangement.

4. The system of claim 3 wherein the delay device creates a delay in the transmission of the laser light to the irradiation site and any reflection of the laser light from the irradiation site such that the time it takes light on the second path to reach the irradiation site from the Bragg device and return is greater than the time in which the Bragg device is able to switch from the first state to the second state.

5. The system of claim 1 wherein the time in which the Bragg device is able to switch from the first state to the second state is in the range of 300 to 500 nanoseconds.

6. The system of claim 1 further comprising an optical amplifier positioned on the second path between the Bragg device and the irradiation site.

7. The system of claim 1 further comprising an optical isolator on the second path between the Bragg device and the irradiation site.

8. The system of claim 7 wherein the optical isolator comprises a polarization discriminating optical component and a phase retarding optical component.

9. A system comprising:
a pre-pulse seed laser that produces laser light;
a first Bragg acousto-optic modulation device switchable between a first state in which the laser light from the pre-pulse seed laser is deflected onto a first beam path and a second state in which the laser light is transmitted in a direction other than onto the first beam path;
a main pulse seed laser that produces laser light;
a second Bragg acousto-optic modulation device switchable between a first state in which the laser light from the main pulse seed laser is deflected onto a second beam path and a second state in which the laser light is transmitted in a direction other than onto the second beam path;
a combiner for directing the laser light from the pre-pulse seed laser on the first beam path and the laser light from the main pulse laser on the second beam path onto a common beam path toward an irradiation site at which a target material may be irradiated by the laser light;
means for switching the first Bragg device from the first state to the second state after the laser light from the pre-pulse seed laser has been deflected onto the first beam path such that at least a portion of any reflections of the laser light from the irradiation site are prevented from reaching the pre-pulse seed laser; and
means for switching the second Bragg device from the first state to the second state after the laser fight from the main pulse seed laser has been deflected onto the second beam path such that at least a portion of any reflections of the laser light from the irradiation site are prevented from reaching the main pulse seed laser.

10. The system of claim 9 further comprising an optical amplifier positioned on the common beam path between the combiner and the irradiation site.

11. The system of claim 9 further comprising, a delay device on the common beam path between the combiner and the irradiation site for delaying the laser pulses.

12. The system of claim 11 wherein the delay device comprises a beam folding optical arrangement.

13. The system of claim 12 wherein the delay device creates a delay in the transmission of the laser light to the irradiation site and any reflection of the laser light from the irradiation site such that the time it takes light on the beam path to reach the irradiation site from either the first Bragg device or the second Bragg device and return is greater than the time in which the first Bragg device and the second Bragg device are able to switch from the first state to the second state.

14. The system of claim 9 wherein the time in which the first Bragg device and the second Bragg device are able to switch from the open state to the closed state is in the range of 300 to 500 nanoseconds.

15. The system of claim 9 further comprising an optical isolator on the common beam path between the combiner and the irradiation site.

16. The system of claim 9 wherein the optical isolator comprises a polarization discriminating optical component and a phase retarding optical component.

17. A method of protecting a laser pulse source from pulse reflections comprising:
   generating a laser pulse on a first path from a laser source;
   passing the laser pulse through a Bragg acousto-optic modulation device, the Bragg device switchable between a first state in which the pulse is deflected onto a second path toward an irradiation site at which a target material may be irradiated by the laser pulse and a second state in which the laser pulse is transmitted in a direction other than onto the second path, while the Bragg device is in the first state; and
   switching the Bragg device from the first state to the second state after the laser pulse has been deflected onto the second path such that at least a portion of any reflections of the laser pulse from the irradiation site are transmitted in a direction other than along the first path, and thus prevented from reaching the laser source.

18. The method of claim 17, wherein the laser source is a seed laser.

19. The method of claim 17, further comprising passing the laser pulse through a delay device after the laser pulse has passed through the Bragg device while the Bragg device is in the first state.

20. The method of claim 19 wherein the delay device creates a delay in the transmission of the laser light to the irradiation site and any reflection of the laser light from the irradiation site such that the time it takes light on the second path to reach the irradiation site from the Bragg device and return is greater than the time in which the Bragg device is able to switch from the first state to the second state.

21. A system comprising:
   a laser source producing laser light on a first path;
   a Bragg acousto-optic modulation device switchable between a first state in which the laser light is deflected from the first path onto a second path toward an irradiation site at which a target material may be irradiated by the laser light and a second state in which the laser light is transmitted in a direction other than onto the second path:
   a delay device comprising a folding arrangement of optical components, located on the second path between the Bragg device and the irradiation site for delaying the laser light; and
   a controller for switching the Bragg device from the first state to the second state after the laser light has been deflected onto the second path such that at least a portion of any reflections of the laser light from the irradiation site are transmitted in a direction other than along the first path, and thus prevented from reaching the laser source.

* * * * *